United States Patent [19]

Kloppenburg

[11] Patent Number: 4,859,918
[45] Date of Patent: Aug. 22, 1989

[54] METHOD AND APPARATUS FOR PRODUCING A SPEED CONTROL VOLTAGE FOR DIRECT CURRENT MOTORS IN TYPEWRITERS OR SIMILAR OFFICE MACHINES

[75] Inventor: Ernst Kloppenburg, Grossefehn, Fed. Rep. of Germany

[73] Assignee: AEG Olympia AG, Wilhelmshaven, Fed. Rep. of Germany

[21] Appl. No.: 78,190

[22] Filed: Jul. 27, 1987

[30] Foreign Application Priority Data

Jul. 26, 1986 [DE] Fed. Rep. of Germany ....... 3625345

[51] Int. Cl.4 .............................................. H02P 5/00
[52] U.S. Cl. .................................... 388/815; 388/910; 388/933
[58] Field of Search ................................ 318/326–327, 318/69–70, 600–601, 685, 309–317, 608–608, 618; 324/161; 364/174

[56] References Cited

U.S. PATENT DOCUMENTS

| | | | |
|---|---|---|---|
| 4,008,424 | 2/1977 | Bompani | 318/327 |
| 4,228,396 | 10/1980 | Palombo et al. | 318/313 |
| 4,270,868 | 6/1981 | Morgan et al. | 318/599 |
| 4,414,496 | 11/1983 | Watanabe et al. | 318/685 |

Primary Examiner—William M. Shoop, Jr.
Assistant Examiner—David Martin
Attorney, Agent, or Firm—Spencer & Frank

[57] ABSTRACT

A method and means for producing a control voltage for controlling a direct current motor makes use of a tachometer voltage providing two ninety degree phase shifted tachometer signals. From these are derived four coding signals comprising the tachometer signals and their inverse signals. The four signals are combined to produce a triangular signal, which is differentiated. The differentiated signal and its inverse are applied through a switching circuit to produce a control signal.

5 Claims, 4 Drawing Sheets

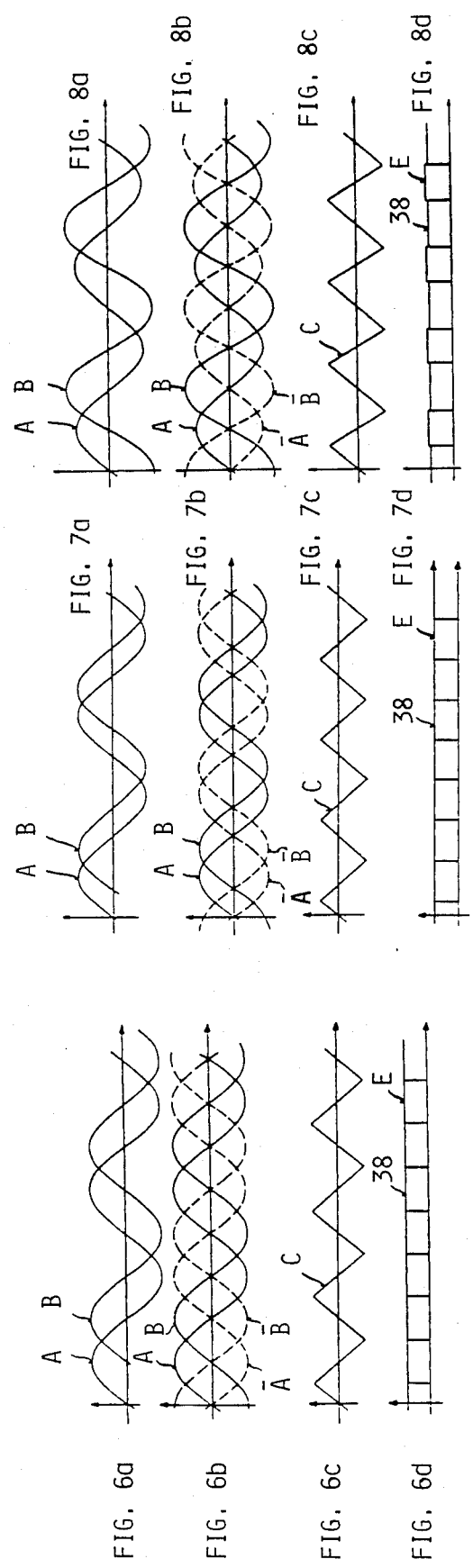

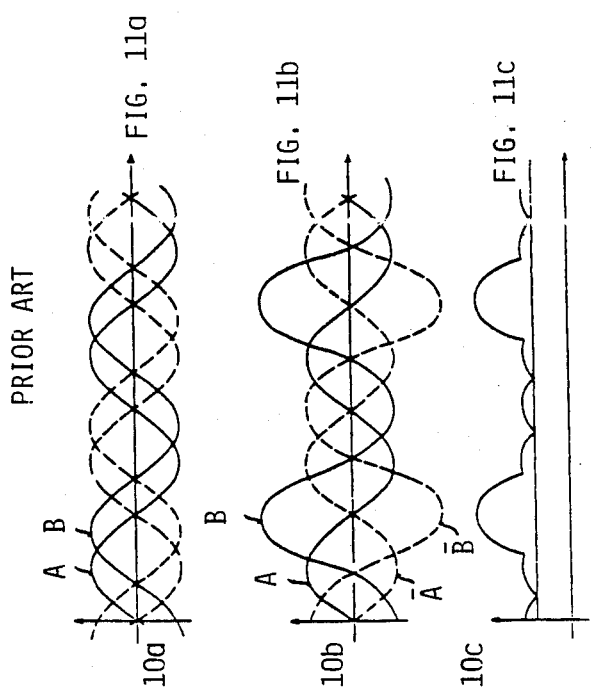
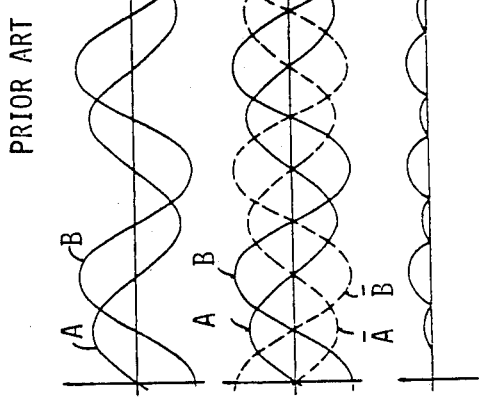
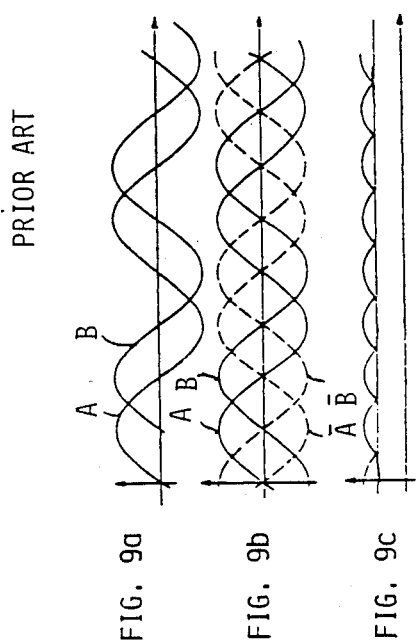

METHOD AND APPARATUS FOR PRODUCING A SPEED CONTROL VOLTAGE FOR DIRECT CURRENT MOTORS IN TYPEWRITERS OR SIMILAR OFFICE MACHINES

BACKGROUND OF THE INVENTION

The invention relates to a method and a circuit arrangement for producing a tachometer voltage for direct current motors in typewriters or similar office machines.

Methods and circuit arrangements of various types are known which use a direct current for controlling direct current motors. The most important parameter of a tachogenerator in a fast servo system is the reaction speed of the tachometer voltage upon changes in the rpm, because this reaction speed, together with the motor, has the greatest influence on the speed of the system. A conventional signal conversion by means of a monostable multivibrator and a subsequently connected integrator does not meet the requirements for such a system. In prior art circuit arrangements the desired speed information determined by a microprocessor and generated by means of a digital/analog converter serves as the comparison value for the tachometer signal. Since an interference component may be superposed on the tachometer voltage, which is a function of the rpm of the motor, for example in the form of temperature influences on the coder output voltage, a compensation circuit is provided. It converts two signals in an arrangement so that a total of four voltages are produced. Diodes make it possible to fullwave rectify each signal pair. If both signals are added, a direct voltage results which has a residual ripple of 30%. Its amplitude is proportional to the amplitude of the voltages of the two signals and consequently also includes all temperature specific influences on the coder. This prior art arrangement is sensitive to fluctuations in sensor tolerance and requires smoothing of the tachometer voltage. Moreover, the sensor also requires a larger volume and has a higher cost than the sensor employed with the present invention.

SUMMARY OF THE INVENTION

It is an object of the invention to provide a method of an arrangement for producing a tachometer voltage for direct current drives in typewriters or office machines of similar construction which do not have the above-mentioned drawbacks. In particular, the residual ripple of the tachometer voltage in the lower rpm range and smoothing of the tachometer voltage is avoided.

According to the method and arrangement of the invention, a control system for a direct current motor which uses a tachometer connected to the motor to derive a speed control signal to control the speed of the motor, is characterized by using the tachometer to derive two signals phase shifted by ninety degrees. These two signals are combined to from four signals, the two original phase shifted signals and their respective inverse signals. These four signals are selected and combined to form a triangular signal which is then differentiated. The differentiated signal and its inverse are then employed through a switching circuit to generate the desired speed control signal for the direct current motor.

A simple sensor with a coarse graduation, e.g. 36°, is sufficient for the method according to the invention, therefore a less costly sensor may be used than in the prior art. Moreover, the circuit arrangement exhibits only a very slight residual ripple in the tachometer voltage in the lower rpm range so that additional smoothing of the tachometer voltage is no longer necessary. Furthermore, in contrast to prior art arrangements, the circuit arrangements of the invention includes only one differentiating circuit.

BRIEF DESCRIPTION OF THE DRAWINGS

FIG. 1 is a schematic illustration of a drive for a carriage, such as a typewriter carriage or the like;

FIGS. 6 through 11 are various curves useful in explaining the invention.

DESCRIPTION OF THE PREFERRED EMBODIMENT

Figure 1:
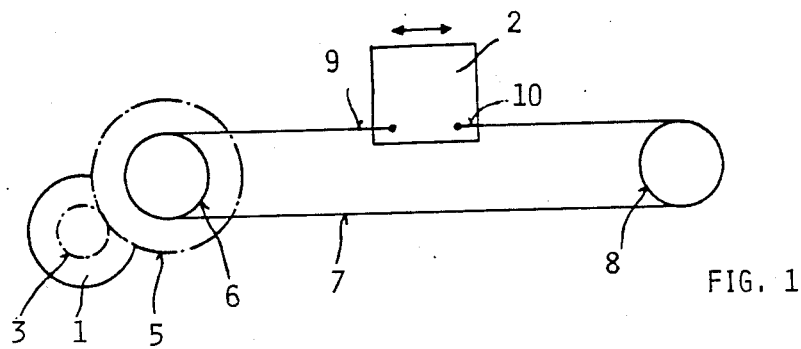

FIG. 1 shows a carriage 2 which is driven by a direct current motor 1 along a record carrier (not shown) and on which a print head, e.g. a rotatably mounted daisy wheel, is disposed. Direct current motor 1 here drives via a drive pinion 3, a gear 5 which is fixed to a cable drum 6. Cable drum 6 is rotatably mounted at one side of the machine frame and is looped by a cable 7 whose one end 9 is fixed to one side of carriage 2 and whose other end 10 is fixed to the other side of carriage 2 by way of a guide roller 8 disposed at the other side of the machine frame.

Figure 2:
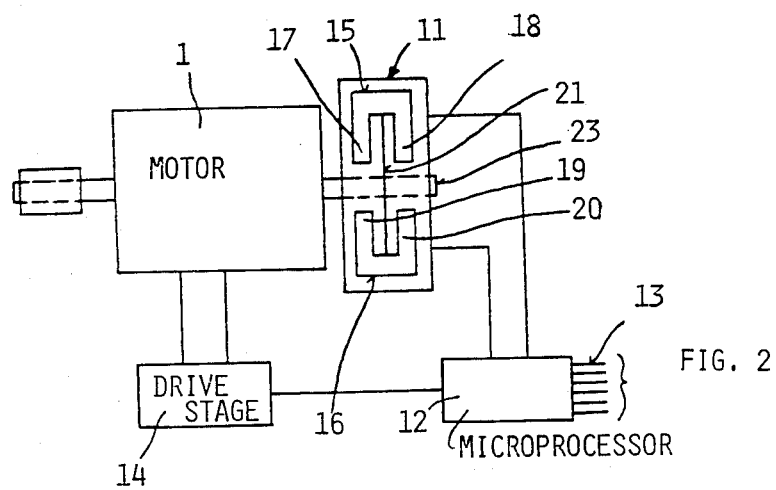
FIG. 2 is a schematic block circuit diagram of a circuit embodying the invention.
Figure 4:
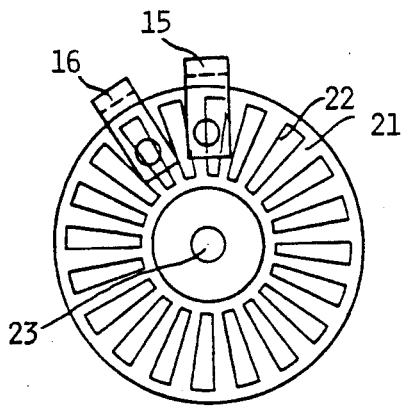
FIG. 4 is a plan view of a sensor which may be used in practicing the invention.

According to FIG. 2, a sensing device 11 is mechanically fixed to the motor shaft 23 of direct current motor 1 so as to indicate position and speed. This sensing device 11 serves as an encoder and includes a clocking disc 21 having radially disposed slits 22 which are scanned by two sensors 15, 16 offset by 90° with respect to one another and produce sinusoidal signals, see also FIG. 4. These sensors 15, 16 each include in a known manner a light transmitter 17, 19 and a light receiver 18, 20. Within the scope of the invention, this scanning device may also include an inductive transducer and transmitter. Important is the generation of two output signals which are offset with respect to one another by one quarter of the signal period. The signals from both sensors 15, 16 are utilized for analog purposes in their original sinusoidal signal form and in digitalized form for further processing by a microprocessor 12. The phase shift of the signals enables the microprocessor 12 to detect the direction of rotation and additionally to perform suitable error treatment routines if, for example, motor shaft 23 was inadvertently deflected by the influence of an extraneous force.

Figure 3:
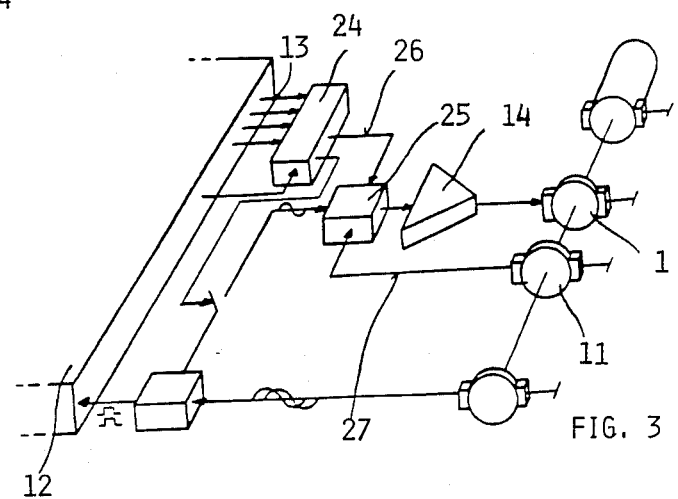
FIG. 3 is a more detailed schematic block circuit diagram of the circuit of FIG. 2.

Microprocessor 12 is in communication with the regulating circuit via input lines 13 and provides the amplitude values and the direction of the adjustment to be performed. Referring to FIG. 3, a digital/analog converter 24 converts the digital speed code furnished by microprocessor 12 to a analog control voltage value on line 26 which is then compared in a comparison or sum circuit 25 with the actual value. According to FIG. 3, sensing device 11 feeds the actual value via line 27 to comparison circuit 25. The speed error determined in comparison circuit 25 is then fed as an error voltage via the motor driver circuit of stage 14 to direct current motor 1. This causes a voltage/current converter to impress a current proportional to the speed error on direct current motor 1.

Figure 5:
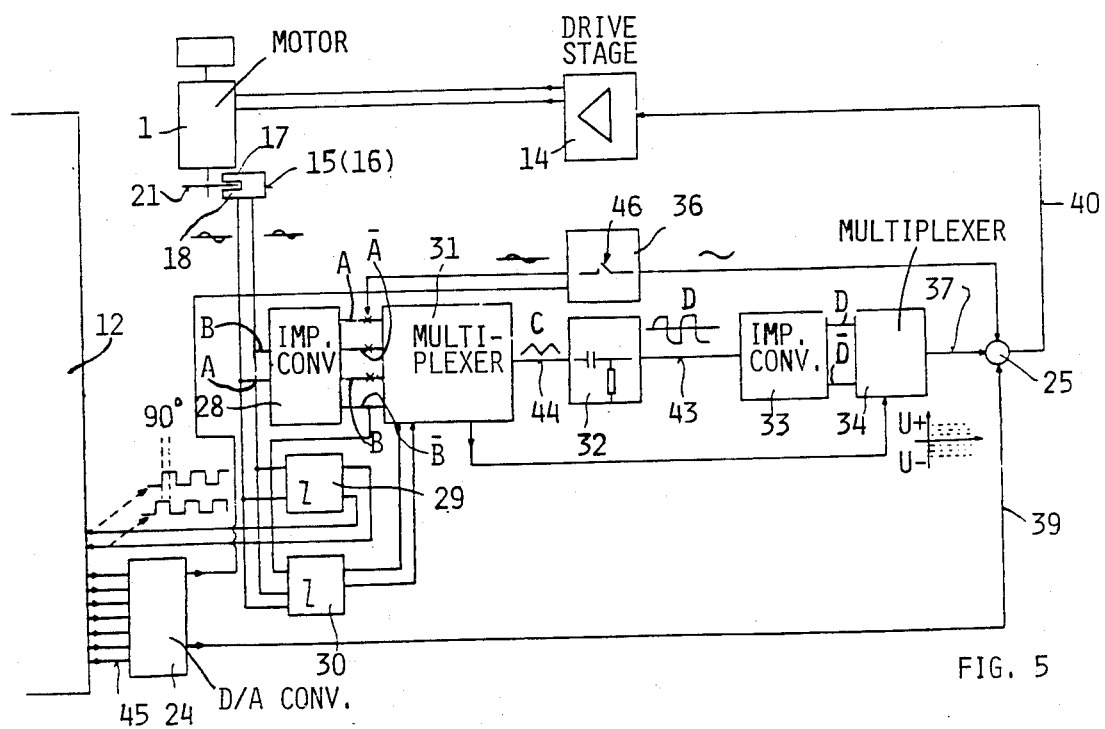
FIG. 5 is a schematic block circuit diagram showing in still more detail the blocks of FIGS. 2 and 3.

Let us now consider FIG. 5. Motor 1 and sensing device 21 form part of the system of a servo device including a closed regulating circuit. The rotary movement of slotted disc 21 generates alternating voltages A and B (FIG. 6a) by way of sensing devices 15, 16 and these voltages are processed in such a manner that a speed signal 38 as shown in FIG. 6d is generated in line 37. This signal on line 37 is fed to comparison or sum circuit 25. A desired value signal is formed in a line 39 and coupled with sum circuit 25 to form a regulating signal in line 40. Line 40 is brought to motor driver stage 14 which controls the operation of direct current motor 1.

The analog signals A and B are each fed, on the one hand, to an impedance converter and an inverter 28 so that a total of four alternating voltages A, B, $\overline{A}$ and $\overline{B}$ result as shown in FIG. 6b. A, B and $\overline{B}$ are digitalized in comparators 30 and forwarded to a multiplexer 31 which produces a triangular oscillation as shown in FIG. 6c. The thus obtained triangular voltage in line 44 is then fed for differentiation to a differentiating circuit 32 formed of a capacitor 41 and a resistor 42 resulting in a voltage D being produced in line 43. This voltage D is fed to an impedance converter and inverter 33, resulting in two signals D and $\overline{D}$. Finally, the speed signal 38 shown in FIG. 6d is then obtained via a multiplexer 34 from these signals D and $\overline{D}$ as the actual value of the tachometer voltage in line 37 and is fed to sum circuit 25.

The reference signal (desired value) in line 39 is generated by digital/analog converter 24. Signals A and B are squared in square wave converter 29 and fed to microprocessor 12. The signals 45 coming from microprocessor 12 are converted in digital/analog converter 24 to an analog reference signal in line 39. In sum circuit 25, a check is made with the aid of the reference signal in line 39 and the speed signal in line 37, whether a speed error is present. A detected speed error or speed control signal is then fed as error voltage via the motor driver stage 14 to the direct current motor so as to correct the rpm of direct current motor 1.

Moreover, sum circuit 25 is also in operative connection with a fine positioning member 36 which is able to regulate the holding position of direct current motor 1 at a desired point. This positioning member 36 includes a switch 46 which, depending on how it is connected, applies A, B, $\overline{A}$ or $\overline{B}$ to sum circuit 25. Closing of this switch 46 causes the fine adjustment zone to become effective in a known manner.

In contrast to the prior art solutions in which the oscillations according to FIGS. 6a and 6b are differentiated separately and then combined, multiplexer 34 is provided with a switching logic which switches in such a manner that the respectively correct speed signal is selected from the two values D and $\overline{D}$ so that the tachometer voltage according to FIG. 6d results.

FIGS. 7a to 7d correspond to curves 6a to 6d which shows that an error in phase shift between signals A and B has no negative effect on the regulating voltage. The curves according to FIG. 6d and FIG. 7d are practically identical.

FIGS. 8a to 8d correspond to curves 6a to 6d, with the two oscillations (A and B) differing considerably in their maximum and minimum. FIGS. 8c and 8d show that this error also has only a very slight influence in the circuit according to the invention. The arrangement according to the invention for generating a tachometer voltage for d.c. servo drives in which such a voltage is composed of two 90° shifted sinusoidal signals requires merely a simple and inexpensive sensor having a coarse graduation. Moreover, this arrangement is insensitive to coarse sensor tolerances and exhibits only a very slight residual ripple in the tachometer voltage in the lower rpm range. Moreover, an absolutely direct voltage (tachometer voltage) without any sudden changes in hysteresis is present during fine positioning. And only one differentiating member is required for the one-time differentiation.

It will be understood that the above description of the present invention is susceptible to various modifications, changes and adaptations, and the same are intended to be comprehended within the meaning and range of equivalents of the appended claims.

I claim:

1. In a method for controlling a direct current motor having a tachometer connected to the motor to derive a speed signal, the steps comprising:
   forming two signals A and B phase shifted 90° from each other;
   forming from the two phase shifted signals A and B four coding signals comprising respectively the two phase shifted signals A and B and their respective inverse signals $\overline{A}$ and $\overline{B}$;
   selecting and combining the four coding signals to form a triangular signal C;
   differentiating said triangular signal C to produce a signal D;
   inverting the signal D to provide the signal D and its inverse $\overline{D}$; and
   generating from the signals D and its inverse $\overline{D}$ a speed value.

2. A circuit arrangement for a direct current circuit motor which is responsive to a speed control voltage, and which uses a tachometer connected to the motor to derive two signals A and B phase shifted from each other by 90° comprising:
   an impedance converter and an inverter to provide from the signals A and B their respective inverse signals $\overline{A}$ and $\overline{B}$ thereby providing four coding signals A, B, $\overline{A}$, and $\overline{B}$;
   multiplexer means selecting and combining the four coding signals A, B, $\overline{A}$, and $\overline{B}$ to form a signal C having a triangular form;
   means to differentiate said signal C to form a differentiated signal D;
   means comprising an inverter providing as output a signal conforming to the differentiated signal D and its inverse $\overline{D}$;
   multiplexer means for deriving from the signals D and $\overline{D}$ a speed control voltage; and;
   means to compare the speed voltage and a speed signal to provide a speed control voltage for the motor.

3. An arrangement as claimed in claim 2 in which the differentiating circuit is composed of a capacitor and a resistor.

4. An arrangement as claimed in claim 2 further comprising:
   means connected to receive and digitalize the two signals A and B and having a digital output;

a microprocessor having an input receiving the digital output and having a digital output; and a digital to analog circuit receiving the microprocessor digital output and having an analogue output connected to the comparator as the speed signal.

5. An arrangement as claimed in claim 2, the coding signals A, B, $\overline{A}$, $\overline{B}$ being respectively sinusoidal in form, the circuit further comprising:

means deriving from the coding signals further digitalized signals applied to the multiplexing means.

* * * * *